Figure 1:
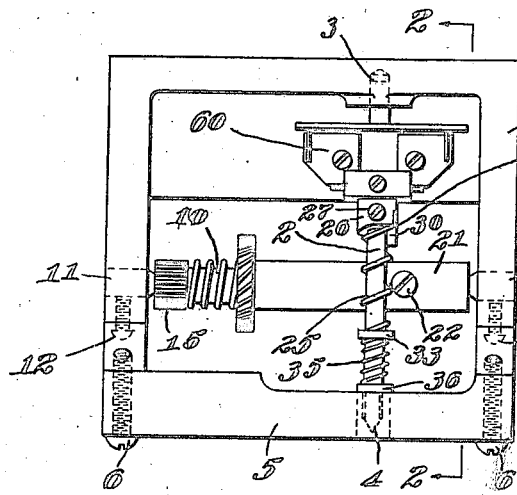

D. W. ALLIS.
YIELDING DRIVING MECHANISM.
APPLICATION FILED JUNE 7, 1920.

1,436,072.

Patented Nov. 21, 1922.

Inventor
Dexter W. Allis
By James R. Hodder
Attorney

Patented Nov. 21, 1922.

1,436,072

UNITED STATES PATENT OFFICE.

DEXTER W. ALLIS, OF WHITMAN, MASSACHUSETTS.

YIELDING DRIVING MECHANISM.

Application filed June 7, 1920. Serial No. 387,111.

*To all whom it may concern:*

Be it known that I, DEXTER W. ALLIS, a citizen of the United States, and resident of Whitman, in the county of Plymouth and State of Massachusetts, have invented an Improvement in Yielding Driving Mechanism, of which the following description, in connection with the accompanying drawings, is a specification, like letters on the drawings representing like parts.

My present invention relates to the mechanical transmission of power and has for its object to provide an improved and novel construction of so-called worm and gear driving devices, together with means to afford a yielding transmission between the driving and driven members in a worm and gear construction.

While my invention is intended primarily for relatively small mechanism and the form shown herein was devised for use in connection with a governor driving device, and wherein a relatively noiseless construction was desirable, yet the invention is not thus limited, but is of value in any mechanism wherein a strong, economical worm and gear drive is desired, and particularly where a provision for yield or cushioning action between the driving and driven members, is desired.

In carrying out my invention I have discovered that a practically noiseless power transmission can be secured and also one which will wear with great evenness and smoothness. These features, including quietness of operation, absence of shock and jar due to the yielding and cushioning features, and freedom from undue friction, are important. Furthermore, a very strong construction is secured, and a mechanism capable or transmitting power with hardened steel bearings on a shaft or axle of softer material.

In many kinds of mechanism, wherein a worm and gear is practically necessary, but where quietness of operation is desirable, it has been heretofore necessary to utilize one of the gears, either the worm or the gear meshing therewith, to be of fiber, which, of course, wore away very quickly and easily, soon became loose and noisy, and was unsatisfactory. My improved construction is sufficiently noiseless to be used where heretofore a fiber worm or gear was necessary.

Other features of construction, novel combinations of parts and advantages will be hereinafter more fully pointed out and claimed.

Figure 2:
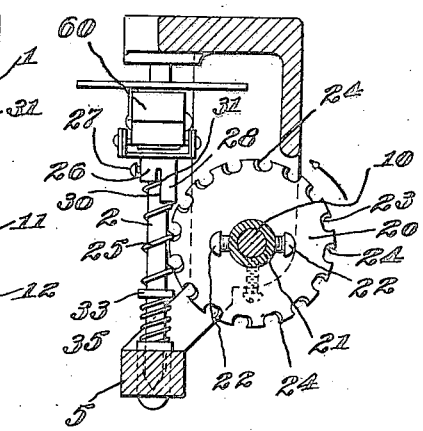
Figure 3:
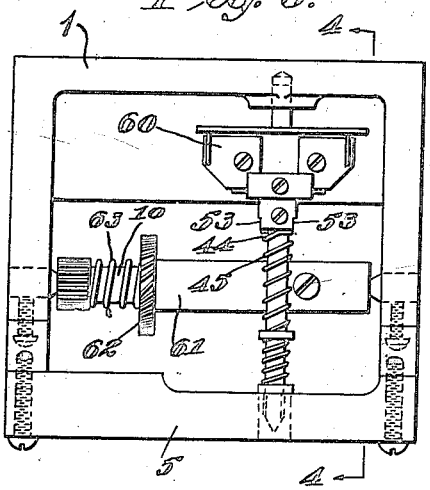
Figure 4:
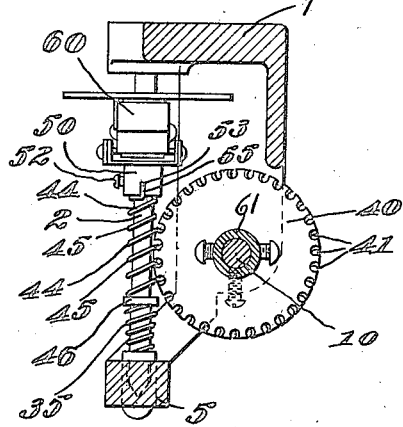

Referring to the drawings, illustrating preferred embodiments of my invention,

Fig. 1 is a view in conventional form showing a worm and gear drive utilized to rotate a governor of well known type;

Fig. 2 being a cross-sectional view on the line 2—2 of Fig. 1;

Fig. 3 is a vertical view of a similar construction utilizing a plurality of driving worm and gear members;

Fig. 4 being a view on the line 4—4 of Fig. 3.

While I have illustrated my invention as applied to a small mechanism, it will be understood that I am not thus limited, the drawings being for illustration only and showing a satisfactory and efficient use of my invention in a small mechanism where noiselessness, compactness and efficiency are important. As illustrated, any suitable framework designated at 1, is adapted to carry a driving and a driven member. As here shown the driven member comprises the shaft 2 suitably journaled in bearings at 3 and 4, one being in the frame 1 and the other in the cross-bar 5, secured to the frame by suitable retaining screws 6, 6, as shown. A driving shaft 10 is mounted at right angles to the shaft 2 and is supported by adjustable pivot pins 11, 11, set through the recesses in the arms of the frame 1, as clearly illustrated, and retained in adjustable position by set screws 12, 12. The shaft 10 in the particular construction herein shown, carries a pinion 15 adapted to mesh with any suitable source of power to rotate the same. A driving wheel 20 has its hub 21 adapted to fit onto the shaft 10 and to be clamped thereto in desired adjusted position laterally by set screws 22, 22. This adjustment enables the driving wheel 20 to be fitted to mesh with the worm. While I designate the gear wheel 20 as the driving gear, and while this is preferable, it is to be understood that I can reverse the driving and driven elements and have the worm member constitute the driving element if desired.

The construction of my novel form of worm gear will now be described. Mounted on the shaft 2 is the worm gear element 25, this constituting a spirally wound steel strip or wire, round, square or otherwise suitably shaped to mesh with the teeth of the gear 20.

I prefer to form this spiral worm element 25 of suitable pitch and appropriate inner diameter, for the particular work involved and to fit loosely but snugly, i. e., a sliding fit, on the shaft 2. For relatively small gears I find that piano wire or equivalent gives good results from which to make the worm element 25. This can be wound in relatively long lengths and cut in short sections as desired. To constitute the driving means from the gear teeth 23 in the gear 20, through the spiral element 25, to the shaft 2, I affix to the shaft 2 a collar 26, secured in desired adjusted position by a set screw 27 and having a downwardly extending portion 28, presenting a bearing face 30. Against this bearing face or edge 30 the topmost edge of the spiral worm element 25, abuts, as shown at 31, Figs. 1 and 2. Adjacent the bottom portion of the shaft is a collar 33, and a coiled spring 35 freely encircling the lower part of the shaft 2, bears between the collar 33 thereon and the bottom collar 36, the latter resting on the crossbar or bridge 5.

As illustrated in Figs. 1 and 2, and as above described, the driven element 20, receiving rotation from the shaft 10, in the direction of the arrow, Fig. 2, exerts its tension through engagement of its teeth 23—the latter being beveled slightly to facilitate smoothness of bearing and action, as indicated in the faces 24, 24, bearing upon the spiral worm element 25. The worm element 25 is practically rigid, and with very little yield or spring, but the bearing downwardly against the collar 33 tends to compress the spring 35 and thus permit the entire coil 25 to slide vertically and downwardly upon the shaft 2, thus effecting a sliding motion between the abutting end 31, and the bearing face 30 on the collar 26 which latter is rigidly secured to the shaft 2. In this way a yielding driving impulse is imparted, and at the same time a smooth, practically noiseless and even wearing action is provided. I consider that one of the important features of this construction is in the fact that the gear wheel 20 has its teeth 23 bearing directly upon the longitudinal grain of the metal in the worm element 25—which is not a cross grain cutting action between the two meshing gear members, as in ordinary worm and gear construction. Where a worm is cut into a shaft it crosses the fibers of the metal, and necessarily results in a greater friction, in the wearing between the teeth and in a grinding and noisy action, quickly wearing loose. By my construction having hardened metal worm element 25 presenting this smooth, tough, and longitudinal fiber surface to the gear wheel, I eliminate to a large degree the grinding and undue wearing in ordinary worm and gear construction, as well as insuring smoothness, quietness and even running. Furthermore the slight yield affected in this driving action, increases the life of the contacting elements, and imparts a slight yield or cushioning effect throughout the entire mechanism, thus eliminating undue strain, shocks, jars or wearing strains.

It will be appreciated that any suitable or desirable yielding device can be employed, herein shown as the small spring 35. A yielding cushion could be utilized for this purpose, felt or the like, or even a closer wound section of the driving worm gear element 25, but I prefer to utilize the same as illustrated. While it is feasible and desirable in many mechanisms to utilize a single coil 25 for the worm gear, it is also within the scope of my invention to utilize a plurality of such coils similar to the spiral 25, thus affording a greater and relatively more rigid driving action, while allowing each coiled member on the worm to yield independently of the other, thereby automatically affording a bearing contact between the gear wheel, or wheels, and each element constituting the spiral. I have illustrated this capability in Figs. 3 and 4, wherein the same construction is utilized for illustrative purposes. In this form the gear wheel secured to the shaft 10 is shown at 40 and provided with double the number of gear teeth 41 than those illustrated on the gear 20. The shaft 2 is fitted with two sets of spiral wormlike elements, 44 and 45, having the coils alternating, and each bearing upon the bottom collar 46. The top collar, however, is here shown at 50 and is rigidly secured to the shaft 2 by a set screw 52, but is provided with a plurality of grooves 53, 53, to receive the upturned end portions of the spiral elements. As illustrated in Fig. 4, the spiral 45 has its end bent as indicated at 55 and fitted slidingly within the groove 53. A similar construction for the end of the spiral 44 is utilized. The operation of the apparatus illustrated in Figs. 3 and 4 is substantially identical with that already described, wherein the driving and driven elements secure their yielding and cushioning driving action through the rotation of the gear 40 against the separate and independent spiral members 44 and 45, the latter both depending upon the thrust of the coiled spring 35 to maintain the spiral springs with their respective ends in driving engagement with the fixed collar 50.

In the mechanism here illustrated, the drawings show a usual type of governor, designated generally at 60, which is secured to the fixed collar 27 in Figs. 1 and 2, and to that shown at 50 in Figs. 3 and 4. Also a bushing 61, separate driving gear 62, and spring 63 are illustrated but are without special function in connection with my present invention, which is the arrangement, construction and operation of gear and worm mechanism.

I believe that my arrangement of a spirally formed gear element such as the coiled member 25 or 44 and 45, being preferably of hardened steel and wound slidingly upon the shaft to be driven, through which it imparts its driving power by a direct bearing at one end, is a distinct novelty and I wish to claim the same herein broadldy.

My invention is further described and defined in the form of claims as follows:

1. A gear element, comprising a shaft and a plurality of separately formed spiral gear elements slidingly fitted on said shaft, in combination with means rigidly secured to the shaft against which the ends of said plurality of members may bear with independent slidable action.

2. A gear element, comprising a shaft and a plurality of separately formed spiral gear elements slidingly fitted on said shaft, in combination with means rigidly secured to the shaft against which the ends of said plurality of members may bear with independent slidable action in combination with yielding means to hold said plurality of spiral elements in contact with the rigid bearing faces on the shaft.

In testimony whereof, I have signed my name to this specification.

DEXTER W. ALLIS.